(12) United States Patent
Carrea et al.

(10) Patent No.: US 7,305,831 B2
(45) Date of Patent: Dec. 11, 2007

(54) GAS TURBINE HAVING EXHAUST RECIRCULATION

(75) Inventors: Elisabetta Carrea, Zurich (CH);
Timothy Griffin, Ennetbaden (CH);
Peter Jansohn, Kuessaberg (DE)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 10/829,376

(22) Filed: Apr. 22, 2004

(65) Prior Publication Data

US 2007/0261408 A1    Nov. 15, 2007

Related U.S. Application Data

(63) Continuation of application No. PCT/IB02/04331, filed on Oct. 18, 2002.

(30) Foreign Application Priority Data

Oct. 26, 2001 (DE) .................... 101 52 297

(51) Int. Cl.
*F02C 1/00* (2006.01)
(52) U.S. Cl. ........................ 60/772; 60/39.52
(58) Field of Classification Search .............. 60/772, 60/722, 750, 39.52; 431/115, 116
See application file for complete search history.

(56) References Cited

U.S. PATENT DOCUMENTS

| | | | | |
|---|---|---|---|---|
| 3,826,083 A | * | 7/1974 | Brandon et al. | 60/750 |
| 3,851,467 A | * | 12/1974 | Sherman et al. | 60/750 |
| 3,969,892 A | * | 7/1976 | Stettler et al. | 60/39.511 |
| 5,154,599 A | * | 10/1992 | Wunning | 431/215 |
| 5,689,948 A | | 11/1997 | Frutschi | |
| 5,794,431 A | * | 8/1998 | Utamura et al. | 60/783 |
| 5,885,068 A | * | 3/1999 | Dobbeling et al. | 431/116 |
| 6,910,335 B2 | * | 6/2005 | Viteri et al. | 60/786 |
| 6,957,539 B2 | * | 10/2005 | Lebas et al. | 60/772 |
| 7,007,487 B2 | * | 3/2006 | Belokon et al. | 60/777 |
| 2002/0023423 A1 | * | 2/2002 | Viteri et al. | 60/39.02 |
| 2005/0282097 A1 | * | 12/2005 | Carrea et al. | 431/9 |

FOREIGN PATENT DOCUMENTS

| | | |
|---|---|---|
| DE | 43 25 802 A1 | 2/1995 |
| DE | 198 10 820 A1 | 9/1998 |
| WO | 01/11215 A1 | 2/2001 |
| WO | 03/036064 A1 | 5/2003 |

OTHER PUBLICATIONS

Search Report from PCT/ IB 02/ 04331 (Jan. 17, 2003).
IPER from PCT/ IB 02/ 04331 May 21, 2003.

* cited by examiner

*Primary Examiner*—William H. Rodriguez
(74) *Attorney, Agent, or Firm*—Adam J. Cermak; Cermak, Kenealy & Vaidya LLP

(57) ABSTRACT

A gas turbine adapted to operate in a highly diluted mode comprises a compressor 3 adapted to compress oxidant 5; a combustion chamber 3 adapted to accept the compressed oxidant 7 and provide an exit means for flue gas 9; a turbine 4; and a flue gas re-circulation means 12,13 adapted to re-circulate the flue gas 9 from the combustion chamber 3 and mix the said flue gas with the compressed oxidant 7 from the compressor 2 in order to provide a highly diluted mode of combustion with a flue gas re-circulation rate of from 100% to 200%.

40 Claims, 12 Drawing Sheets

GAS TURBINE HAVING EXHAUST RECIRCULATION

This application is a Continuation of and claims priority under 35 U.S.C. § 120 to International application number PCT/IB02/04331, filed 18 Oct. 2002, and claims priority under 35 U.S.C. § 119 to German application number 101 52 297.5, filed 26 Oct. 2001, the entireties of both of which are incorporated by reference herein.

FIELD OF THE INVENTION

The invention relates to a gas turbine and a method of operating a gas turbine.

Gas turbines operate on the basis of fossil fuel combustion. Fossil fuel combustion processes are these days governed by two major requirements which are in contrast with one another. On the one hand, a combustion process should achieve the highest possible efficiency (so as to save fuel and reduce CO2 emissions); on the other hand, the process should minimize pollutant omissions (for example NOx).

One of the most common ways to improve efficiency of a combustion process is to use high combustion air preheating. This approach causes combustion to take place at relatively high flame temperatures and eventually the energy of the high temperature combustion gases is transferred to the combustion air using a recuperative or regenerative heat exchanger. One drawback of high preheated air temperatures is that the flame experiences increased peak temperatures, with a disastrous effect upon the thermal-NOx formation path. Research has been carried out on the combustion of hydrocarbons using diluted reacting mixtures that are kept at a temperature above the self-ignition threshold via the re-circulation of flue gas. The use of the flue gas dilutes the reacting mixture and can be used to provide the energy to allow for self-ignition.

Flue gas re-circulation increases the contents of inerts in a mixture. Early research into the flammability limits for combustion of hydrocarbons and air [Zabetakis, 1965] showed that it is possible to obtain flammable mixtures for re-circulation rates of up to 50%. More recent research aimed at providing reliable operating conditions for practical systems has shown that re-circulation rates of up to 30% can be used as a NOx-reducing technique [Wilkes and Gerhold, 1980]. The re-circulation rate R is defined as the ratio of the flow rate of the re-circulated flue gas and the flow rate of the fresh mixture fed into the combustion chamber:

$$R = \frac{G_{IR} + G_{ER}}{F + Ox}$$

where:

$G_{IR}$=Flue gas re-circulated inside the combustion chamber;

$G_{ER}$=Flue gas re-circulated outside the combustion chamber;

F=Fuel; and

Ox=fresh oxidant (usually air).

It has recently been found that it is possible to stabilize a flame at a much higher flue gas re-circulation rate. This can produce a mode of combustion that produces a non-visible, non-audible flame. Such a flame is associated with even temperature and concentration profiles, and no hot spots. This alternate combustion mode, termed for the purposes of this document as "highly diluted combustion", arises as a result of the very high level of dilution of the reacting mixture. The high level of dilution prevents the formation of localised temperature peaks and thus lowers NOx formation. To achieve an operating set-up that exploits the self-ignition of the flammable diluted mixture, it is necessary to provide a mixture temperature that is above the autoignition threshold. Such a condition will result in a very low temperature difference between the initial and adiabatic flame temperatures, as compared to conventional non-diluted visible flames.

$$T_{ad} = T_{in} - \frac{\Delta H_R}{c_p} \cdot Y_{Fuel} = -\frac{\Delta H_R}{c_p} \cdot \frac{1}{R+1} \cdot \frac{F}{F+Ox}$$

$$\Delta T = T_{ad} - T_{in} \propto \frac{1}{R+1}$$

where:

$T_{ad}$=adiabatic temperature (K);

$T_{in}$=initial temperature of the reacting mixture (K);

$\Delta H_R$=heat of the reaction (kJ/kg);

$c_p$=specific heat of reacting mixture;

$Y_{FUEL}$=molar fraction of burned fuel;

R=re-circulation rate;

F=fuel molar rate; and

Ox=oxidant molar rate.

The above two equations indicate that the difference between the adiabatic temperature (Tad) and the initial temperature (Tin) of the mixture decreases as R increases. The re-circulation rate R acts on the value of the initial temperature (Tin), as this is the result of an energy balance between the re-circulated flue gas and the fresh oxidant stream fed into the combustion chamber. However, the value of R does not affect the value of the adiabatic temperature (Tad), as shown from further elaboration of the above equations in conjunction with standard equations of adiabatic combustion:

$$T_{ad} = T_{oxi} - \frac{\Delta H}{c_p} \cdot \varphi(\phi) \text{ where:}$$

$$\varphi(\phi) = \phi \cdot \left(\frac{Y_{Fuel}}{Y_{oxi}}\right)_{stoich} + 1$$

$T_{oxi}$=oxidant inlet temperature;

$\phi$=equivalence ratio; and $Y_{oxi}$=oxidant mole fraction.

The application of highly diluted combustion has so far relied upon a separate injection method of fuel and air into the combustion chamber in order to obtain a two-step mixing process. Fresh air is mixed with re-circulated flue gas, which is further mixed with fuel in order to obtain the desired thermal conditions of the mixture before ignition can take place. U.S. Pat. No. 5,154,599 discloses that a stable, highly diluted, non-polluting flame is achievable only for flue gas re-circulation rates higher than 200%. Furthermore, highly diluted combustion has only been practically applied to high temperature processes that operate at atmospheric pressure, such as those used in the steel making industry and those associated with glass making.

The equivalence ratio parameter ($\Phi$) is frequently encountered in the standard literature of combustion, and is simply defined as:

$$\Phi = \frac{1}{\lambda}$$

The relative air to fuel ratio, $\lambda$, is defined as:

$$\lambda = \frac{(\%\ \text{fuel}/\%\ \text{air})_{stoichiometric}}{(\%\ \text{fuel}/\%\ \text{air})_{actual}}$$

where:

% fuel and % air are the molar percentage (or molar fraction) of fuel and air respectively derived by:

$$\%\ \text{fuel} = \frac{F_{Fuel}}{F_{Air} + F_{Fuel}}$$

$$\%\ \text{air} = \frac{F_{Air}}{F_{Air} + F_{Fuel}}$$

and where:

$F_{Air}$ and $F_{Fuel}$ are the molar flow rates of air and fuel respectively.

Excess air is defined as: $e(\%)=(\lambda-1)*100$.

Combustion is usually characterised by the stoichiometry of the reacting mixture.

$\lambda<1$ ($\phi>1$): fuel rich mixtures—rich stoichiometry $\lambda=\phi=1$: stoichiometric conditions $\lambda>1$ ($\phi<1$): fuel lean conditions—lean stoichiometry Gas turbines are typically operated with a very lean flame ($\lambda \geq 2$) at around 20 bar, with the oxidant (usually air) preheated to 720 K by compression, and with a flame temperature of around 1750 K. Typical systems have ignition delay times of the order 3 to 5 ms, with residence times of the order of 20 ms. Targeted emission levels are: UHC and CO below 10 ppm, and single digit NOx ppm (normalised at 15% $O_2$). These example conditions refer to a gas turbine operating in a full engine load operation mode, and it is necessary to respect the above constraints.

The highly diluted combustion mode is established by re-circulating a sufficient amount of flue gas into the fresh mixture such that the mixing temperature that results from this dilution is above the self-ignition threshold.

The prior art (e.g. U.S. Pat. No. 5,154,599) concerning highly diluted combustion refers to high temperature processes (for example in furnaces) carried out at atmospheric pressure (i.e. 1 bar). In these situations combustion is usually run at $1<\lambda<1.5$ (specifically to $\lambda=1.1$ that is with excess air of 10%). In order to establish a highly diluted combustion mode with a non-visible flame, a re-circulation rate higher than 200% is disclosed as being required. The prior art also discloses oxidant preheating as being a requirement for highly diluted combustion.

Implementing a highly diluted combustion mode in a gas turbine would allow the flame temperature to be maintained at the desired operating value with a much lower difference between the adiabatic and initial temperatures ($\Delta T$). This would help solve the problem of suppressing high temperature spots, and could bring benefits in terms of emissions levels and combustion efficiency by providing a uniform temperature field.

In order to implement highly diluted combustion into gas turbines, the characteristic time scales associated with gas turbines would need to be taken into account. Diluting the reaction mixture has the effect of slowing down the kinetics of the process, which thus effects both ignition delay times and the overall reaction times.

The object of the invention is to provide an application of the highly diluted combustion technique to gas turbines taking into account the associated operating conditions and constraints.

According to a first aspect of the invention there is provided a gas turbine adapted to operate in a highly diluted mode, the said turbine comprising: a compressor adapted to compress oxidant; a combustion chamber adapted to accept the compressed oxidant and provide an exit means for flue gas; a turbine; and a flue gas recirculation means adapted to re-circulate the flue gas from the combustion chamber and mix the said flue gas with the compressed oxidant from the compressor in order to provide a highly diluted mode of combustion with a non-visible flame with a flue gas re-circulation rate of from 100% to 200%.

Such a gas turbine is adapted to operate in a highly diluted combustion mode without the need for additional preheating of the oxidant before it enters the combustion chamber. This is because the oxidant is heated by compression work in the compressor. This contrasts to prior art applications of highly diluted combustion, where a separate oxidant preheating means is a requirement in order to achieve autoignition of the diluted fuel/oxidant mixture, which is necessary to achieve the characteristic combustion conditions.

In conventional gas turbine systems a lean premix flame is used, which is typically aerodynamically stabilised via a swirl device. In contrast, gas turbines according to the first aspect of the invention do not require such aerodynamic stabilisation.

In a particularly preferred embodiment the flue gas re-circulation means is adapted to provide a flue gas re-circulation rate of from 100% to 150%.

In a preferred embodiment the flue gas re-circulation means is adapted to provide flue gas re-circulation inside the combustion chamber. In another preferred embodiment the flue gas re-circulation means is adapted to provide flue gas re-circulation outside the combustion chamber. The flue gas re-circulation means may be adapted to re-circulate flue gas that exits the turbine. Preferably the gas turbine is adapted to cool the re-circulated flue gas that exits the turbine and to feed the said re-circulated flue gas that exits the turbine into the compressor along with the oxidant. In a particularly preferred embodiment the flue gas re-circulation means is adapted to provide flue gas re-circulation by a combination of means inside and outside the combustion chamber.

In a preferred embodiment the gas turbine further comprises an oxidant pre-heating means adapted to heat the compressed oxidant before the said oxidant enters the combustion chamber. Preferably the oxidant pre-heating means comprises a heat exchanger adapted to use the heat of gas exited from the turbine to heat the compressed oxidant. In a particularly preferred embodiment the heat exchanger comprises a recuperator or a regenerator. Preferably re-circulated flue gas exited from the turbine is cooled by means of the heat exchanger.

In a preferred embodiment the flue gas re-circulation means is adapted to mix the re-circulated flue gas with a premixed stream of fuel and oxidant before the said premixed stream enters the combustion chamber.

In a preferred embodiment the oxidant pre-heating means comprises an external heat source. In a particularly preferred embodiment the external heat source comprises a catalytic pre-burner.

In a preferred embodiment the oxidant is oxygen.

According to a second aspect of the invention there is provided a flameless steam injected gas turbine comprising: a gas turbine according to the first aspect of the invention; and a steam generator adapted to produce steam using energy from the flue gas that exits the turbine, and to feed the said steam into the combustion chamber in order to further dilute the oxidant and fuel mixture.

In a preferred embodiment the flameless steam injected gas turbine operates a closed loop system, and further comprises a condenser adapted to condense the steam and re-introduce resulting water into the steam generator.

In a preferred embodiment the flameless steam injected gas turbine operates an open loop system, and wherein the steam generator is continuously topped up with water.

In a preferred embodiment a portion of the steam produced by the steam generator is fed into the turbine to increase the power output of the turbine.

According to a third aspect of the invention there is provided a method of operating a gas turbine comprising: using a compressor to compress oxidant; using a combustion chamber to accept the compressed oxidant and provide an exit means for flue gas; using a turbine; and using a flue gas recirculation means to re-circulate the flue gas from the combustion chamber and mix the said flue gas with the compressed oxidant from the compressor in order to provide a highly diluted mode of combustion with a non-visible flame with a flue gas re-circulation rate of from 100% to 200%.

In a particularly preferred embodiment the method further comprises using the flue gas re-circulation means to provide a flue gas re-circulation rate of from 100% to 150%.

In a preferred embodiment the method comprises using the flue gas re-circulation means to provide flue gas re-circulation inside the combustion chamber. In another preferred embodiment the method comprises using the flue gas re-circulation means to provide flue gas re-circulation outside the combustion chamber. The method may comprise using the flue gas re-circulation means to re-circulate flue gas that exits the turbine. Preferably the method further comprises cooling the re-circulated flue gas that exits the turbine before feeding the said flue gas that exits the turbine into the compressor along with the oxidant. In a particularly preferred embodiment the method further comprises using the flue gas re-circulation means to provide flue gas re-circulation by a combination of means inside and outside the combustion chamber.

In a preferred embodiment the method comprises using an oxidant pre-heating means to heat the compressed oxidant before the said oxidant enters the combustion chamber. Preferably the method comprises using a heat exchanger to provide the oxidant pre-heating means, and employing the said heat exchanger to heat the compressed oxidant using the heat of gas exited from the turbine. In a particularly preferred embodiment the method comprises providing the heat exchanger in the form of a recuperator or a regenerator. The method may comprise using the heat exchanger to cool the re-circulated flue gas exited from the turbine.

In a preferred embodiment the method comprises using the flue gas re-circulation means to mix the re-circulated flue gas with a premixed stream of fuel and oxidant before the said premixed stream enters the combustion chamber.

In a preferred embodiment the method comprises using an external heat source to provide the oxidant pre-heating means. In a particularly preferred embodiment the method comprises using a catalytic pre-burner to provide the external heat source.

In a preferred embodiment the method comprises using oxygen as the oxidant.

According to a fourth aspect of the invention there is provided a method of operating a flameless steam injected gas turbine comprising: using a gas turbine according to the first aspect of the invention; and using a steam generator to produce steam using energy from the flue gas that exits the turbine, and feeding the steam into the combustion chamber in order to further dilute the oxidant and fuel mixture.

In a preferred embodiment the method comprises operating the said flameless steam injected gas turbine as a closed loop system, and using a condenser to condense the steam and re-introduce resulting water into the steam generator.

In a preferred embodiment the method comprises operating the said flameless steam injected gas turbine as an open loop system, and continuously topping up the steam generator with water.

In a preferred embodiment the method comprises feeding a portion of the steam produced by the steam generator into the turbine in order to increase the power output of the turbine.

BRIEF DESCRIPTION OF THE DRAWING FIGURES

For a better understanding of the invention, several embodiments of a gas turbine in accordance with the invention will now be described with reference to the accompanying drawings in which.

DETAILED DESCRIPTION OF EMBODIMENTS OF THE INVENTION

Figure 1:
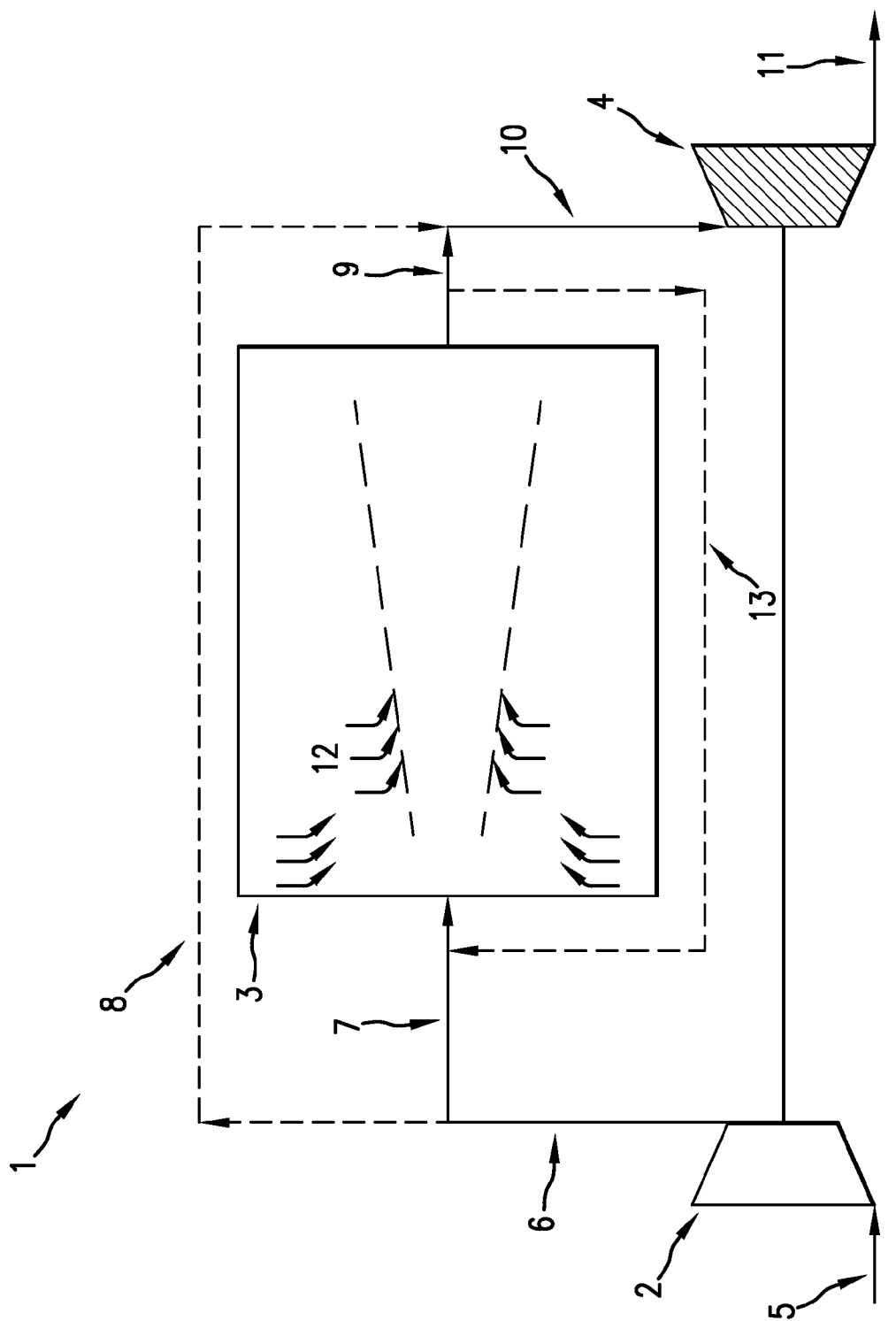
FIG. 1 is a schematic diagram of a gas turbine according to a first embodiment of the invention.

FIG. 1 is a schematic diagram of a gas turbine 1 according to a first embodiment of the invention provided with a compressor 2, a combustion chamber 3 and a turbine 4. The principles of the operation of a gas turbine and the operational relationship between the compressor 2, combustion chamber 3 and the turbine 4 are very well known to those skilled in the art and will not be discussed here in detail. The present invention is not limited by the type of compressor 2, turbine 4 or combustion chamber 3 used. For example, the combustion chamber 3 may be of the can, annular or can-annular type. The choice of type of combustion chamber 3 will be dictated by space constraints, mixing capabilities, emissions potentialities and desired power output levels. Furthermore, the present invention is also not limited by the type of fuel used, and any fuel suitable for gas turbines may be used with this and other embodiments of the invention.

The compressor 2 sucks-in the oxidant 5, which in this embodiment is air, from the external environment and compresses it to the required operating pressure. Alternatively, other oxidants could be used, in which case the compressor would be fed gas from a suitable storage means. The required operating pressure is 20 bar, and the oxidant is heated up to 720 K by compression work. However, different turbine configurations or the use of other oxidants may require the use of different pressures.

The compressed oxidant 6 exits the compressor 2 and a portion of the compressed oxidant 8 is directed so as to bypass the combustion chamber 3 in order to be used as a cooling agent upstream the turbine 4. This portion of the compressed oxidant 8 may be 10 to 25% of the total compressed oxidant 6 outputted from the compressor 2. Alternatively, all of the compressed oxidant 6 from the compressor may be passed directly into the combustion chamber 3. Under a full load operation, the compressed oxidant 6 would typically have a temperature of 725 K and a pressure of 20 bar.

The portion of the compressed oxidant 7 that is not used as a cooling agent is then mixed with re-circulated flue gas 12, 13, before being passed into the combustion chamber 3. In the combustion chamber 3, the fuel and compressed oxidant mixture is burned in a highly diluted mode, with the associated non-visible, non-audible flame. The gasses inside the combustion chamber are typically at 1800 K. NOx levels are typically less than 5 ppm, and CO levels less that 10 ppm.

The fresh oxidant 7 and fresh fuel are injected into the combustion chamber 3 in such a way that proper mixing takes place among the oxidant 7, fuel and flue gas 12, 13. This embodiment employs a premix injection system in which the oxidant 7 and flue gas 12, 13 are mixed prior to contact with the fresh fuel. Alternatively fresh fuel can be mixed with flue gas 12, 13 prior to contact with fresh oxidant 7. However, different mixing arrangements can be used according to the specific configurations and requirements of the operating system. In other embodiments a two-stage premix burner could be used, in which a portion of the flue gas 12,13 is premixed with the fresh oxidant 7 and the remainder is premixed with the fresh fuel, with the complete mixing of the two resulting mixtures occurring downstream in a second stage mixer.

In other embodiments still, fresh oxidant 7 and fresh fuel could be fed via a diffusion type injection system, the aerodynamics of which could be arranged such that mixing occurs in the combustion chamber 3 such that fresh oxidant 7 comes in contact with flue gas 12, 13 prior to contact with the fuel, with the oxidant 7 and fuel coming into contact at a last stage. Alternatively, a diffusion type injection system could ensure that the fuel first comes into contact with the flue gas 12, 13, prior to contact with the oxidant 7.

The optimum mixing solution will be dictated by space constraints, allowed pressure drops and minimum required residence time of the system.

The stoichiometry of the fuel/air mixture does not have to be extremely lean as required for conventional lean premix gas turbine systems. The equivalence ratio ($\phi$) can be adjusted so as to provide a reacting mixture above the autoignition temperature whose combustion will satisfy the required turbine inlet temperature giving low emissions. In this respect the equivalence ratio of the reacting mixture will be tuned to satisfy such requirements together with the flue gas re-circulation rate.

In this embodiment flue gas re-circulation is carried out via a combination of means inside 12 and outside 13 the combustion chamber 3. Alternatively, flue gas re-circulation can be carried out entirely inside or outside the combustion chamber 3.

Once combustion has taken place, flue gas 9 exits the combustion chamber 3 and joins the portion of the compressed oxidant 8 used as a coolant stream. The mixture 10 of flue gas 9 and the oxidant 8 used as a coolant stream then flows to the turbine 4. This mixture 10 of gasses drives the turbine 4, and the gasses are then discharged as exhaust gas 11.

A high level of flue gas re-circulation is required to produce a non-visible, highly diluted flame. The re-circulation rate can vary according to the embodiment and can be varied during operation to cope with different engine load requirements within the same combustion system. The precise choice of the re-circulation rate and its splitting between means inside 12 and outside 13 the combustion chamber 3 is dictated by factors such as the mixture autoignition threshold, the re-circulation systems adopted, the minimum residence time, the allowed pressure drops and mixing capability of the system. If a gas turbine were run at re-circulation rate of zero a standard, non-diluted, flame type combustion would be carried out.

Figure 10:
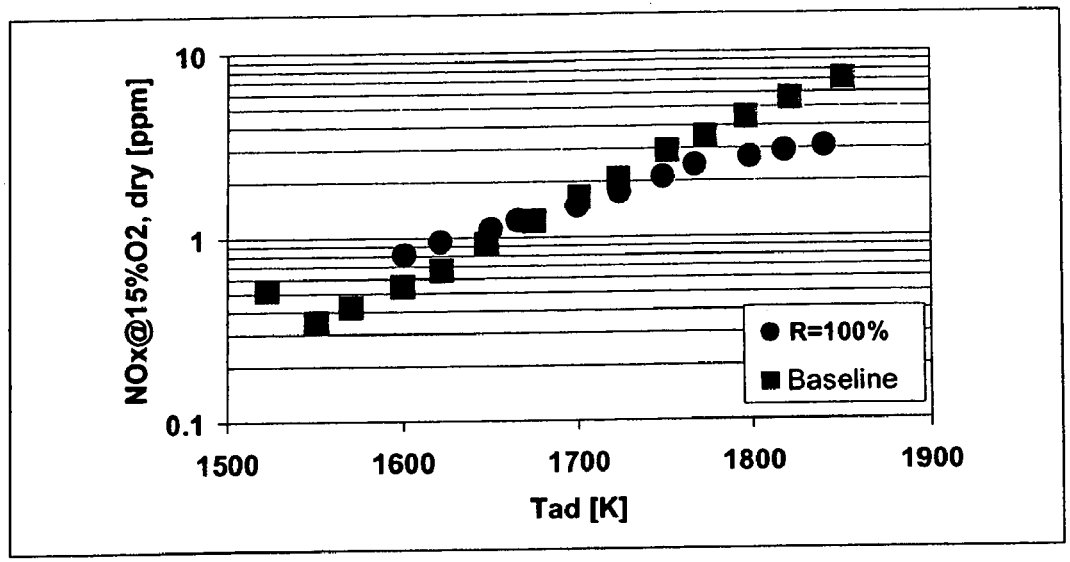
FIG. 10 is a graph of NOx levels against temperature for both a highly diluted flame with a re-circulation rate of 100%, and a non-diluted flame with a re-circulation rate of zero.

FIG. 10 shows a comparison of experimental results concerning a highly diluted flame with a re-circulation rate of 100% and a standard, non-diluted flame with a re-circulation rate of zero. The experiments were carried out with natural gas as a fuel, and with an inlet temperature of 600° C. FIG. 10 shows that the amount of NOx produced by the highly diluted flame is less sensitive to flame temperature than the baseline flame. At 1800 K, the diluted flame shows a 40% reduction in the amount of NOx produced as compared to the baseline flame.

FIG. 10 indicates that combustion using a high level of flue gas re-circulation is effective at reducing NOx production, especially at high firing temperatures where the NOx production becomes critical due to the high dependence thermal NOx production on temperature. On this basis, flue gas re-circulation and highly diluted combustion can mitigate the well known problems of thermal NOx production in the lean flames typically used in gas turbines. Experiments have shown that using a higher inlet temperature than 600° C. will produce an increase in the reduction of NOx associated with the highly diluted flame. It also has the effect of enlarging the temperature operating range at which the highly diluted combustion has better NOx potential than the baseline flame.

Optical observations of the flame operating under typical gas turbine conditions (for example lean flame with equivalence ratios less than 0.6) have allowed a limit to be identified regarding the onset of a non-visible flame that is associated with highly diluted combustion. It has been found that at re-circulation rates of 100% a non-visible mode is established under typical gas turbine operating conditions. Such a re-circulation rate is significantly lower than the re-circulation rate of 300% that is disclosed in the prior art as being a requirement.

In the high temperature, atmospheric pressure applications of the prior art combustion is usually run at $1<\lambda<1.5$ (more specifically to $\lambda=1.1$, that is with excess air of 10%). In gas turbine systems, the operating conditions are very different and $\lambda$ is typically greater than or equal to 2, and the pressure is typically 20 bar. In such conditions it has been observed experimentally that for $\lambda$ greater than or equal to 2 a flue gas re-circulation rate higher than 100% is sufficient to establish the non-visible flame that is associated with highly diluted combustion.

Figure 13:
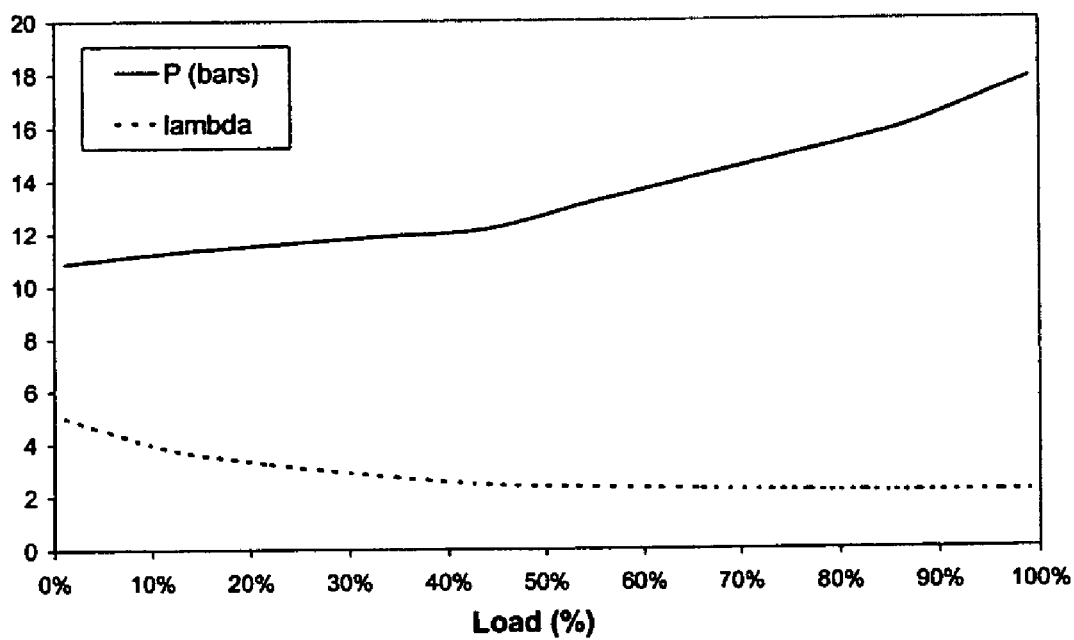
FIG. 13 is a graphical illustration of both operating pressure and stoichiometry (□ or lambda) over load for a typical gas turbine engine.

FIG. 13 shows a graphical illustration of a typical gas turbine engine operation over the load in terms of operating pressure and stoichiometry ($\lambda$ or lambda). Optical observations have revealed that the lower the value of $\lambda$, the lower the flue gas re-circulation rate necessary to allow the onset of the highly diluted combustion mode. The process temperature of a gas turbine is controlled mainly by the stoichiometry of the reacting mixture, and a lean stoichiometry results in a low adiabatic flame temperature and thus low NOx emissions.

The prior art discloses that flue gas re-circulation limits the process temperature. At high levels of oxidant preheating a high flue gas re-circulation is needed in order to control the process temperature in order to limit NOx emissions.

In the prior art, the flue gas re-circulation mainly controls the process temperature as the system is non-adiabatic, with flue gas being cooled before it is re-circulated. However, the combustion chamber 3 of a gas turbine is required to work at conditions as close as possible to adiabatic conditions in order to produce a high cycle efficiency. This results in a quasi-adiabatic flue gas re-circulation in the embodiments of the present invention, as the cooling of the flue gas 12,13 before re-circulation is minimized, and thus the flue gases 12,13 are re-circulated at a very high temperature. These quasi-adiabatic conditions also help allow the highly diluted combustion mode to be established in the gas turbine combustion chamber 3 at re-circulation rates lower than the values stated as being necessary in the prior art.

Figure 11:
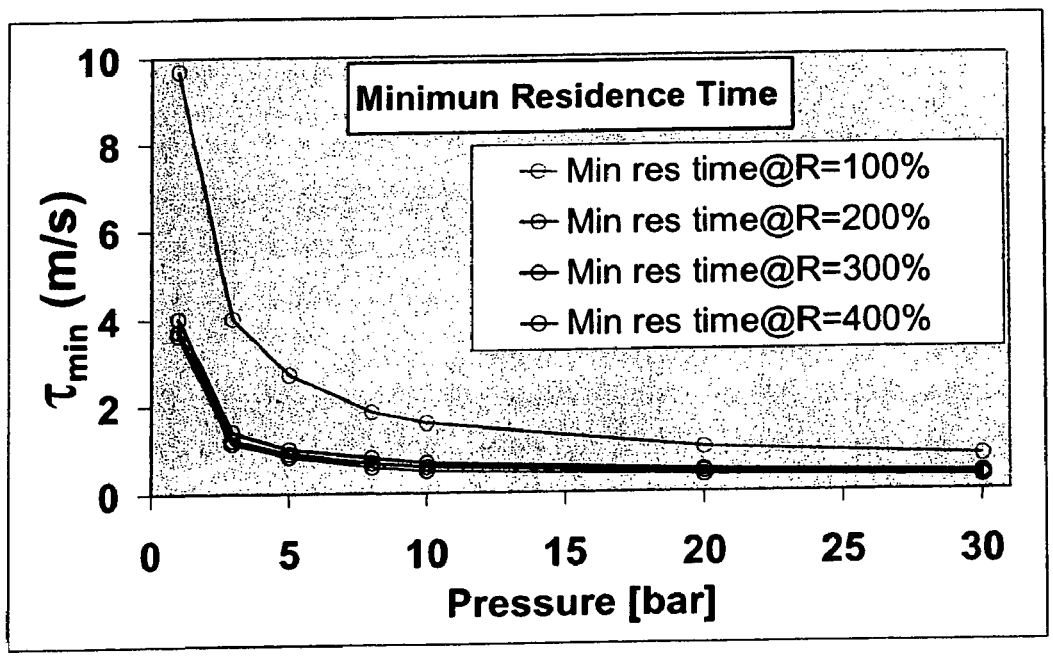
FIG. 11 is a graph of minimum residence time of the mixture against operating pressure for different re-circulation rates.

The optimal re-circulation rate will vary according to the design and specific operating conditions of the particular gas turbine. Chemical kinetic studies have allowed information regarding the characteristic timescales and emissions potential of a gas turbine system operating in a highly diluted combustion mode to be calculated. FIG. 11 shows a graph of calculated residence time necessary to achieve burnout of the mixture against the operating pressure. FIG. 11 indicates that there is a significant effect on the minimum residence time and the ignition delay for flue gas re-circulation rates from 100% to 200%. However, these studies have shown that flue gas re-circulation rates greater that 200% are found not to bring any appreciable additional benefit in this respect.

In further contrast to atmospheric systems, gas turbines have to comply with severe pressure drop constraints. The lower the pressure drop associated with a gas turbine combustion system, the higher the cycle efficiency.

In the embodiment of FIG. 1 the flue gas re-circulation inside 12 the combustion chamber 3 is achieved through the use of high velocity jets. The higher the velocity, or momentum, of a jet, the higher the rate of re-circulated gas. However, higher jet velocities are also associated with higher pressure drops.

Figure 12:
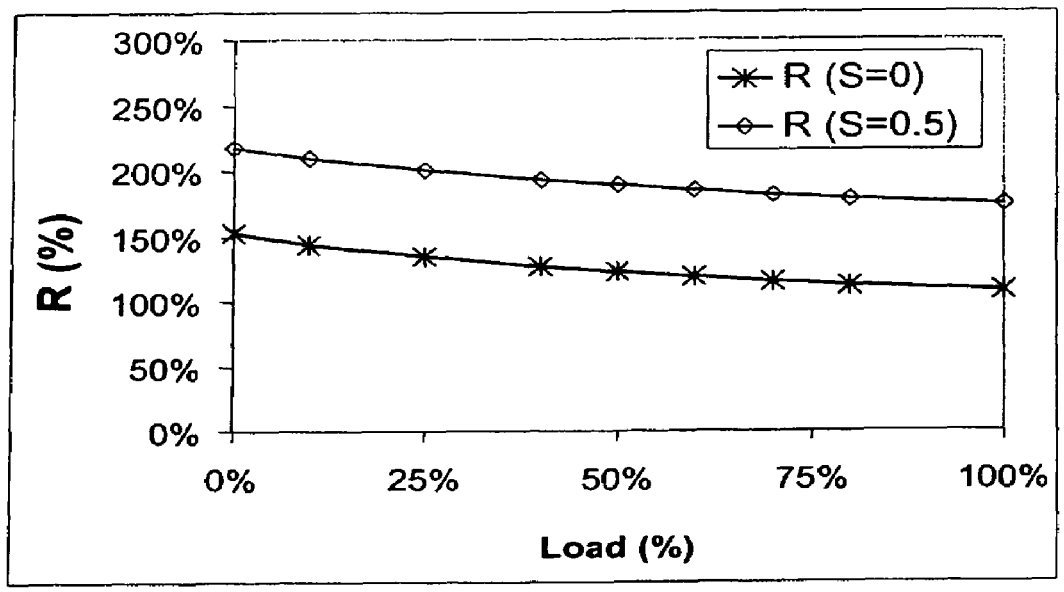
FIG. 12 is a graph of re-circulation rate against load.

Aerodynamic studies have shown that for a typical gas turbine system the maximum re-circulation rate that can be achieved with simple high velocity jets while respecting the pressure drop constraints varies from 100% to 200% (see FIG. 12).

As FIG. 12 shows, the re-circulation rate can be enhanced by the use of additional devices such as a swirl component. However, even with such devices a pressure drop limit will still be experienced well below the 200% disclosed as being a requirement for highly diluted combustion in atmospheric systems of the prior art.

In a typical gas turbine system the maximum pressure drop allowed for the burner module is 3% of the total operating pressure. The use of single free jets could provide re-circulation rates higher than 200%, whilst keeping the pressure drop of the burner/injector module below the 3% limit. However, gas turbines operating with very high air to fuel ratios (i.e. very lean mixtures) and severe space constraints cannot use a burner based on single free jets. The design of high velocity jet injectors is limited by the inherent space constraints associated with gas turbines and the pressure drop limit. Each jet will interfere with the adjacent jets and the nominal entrapment capability of each single jet will be depleted.

Figure 14:
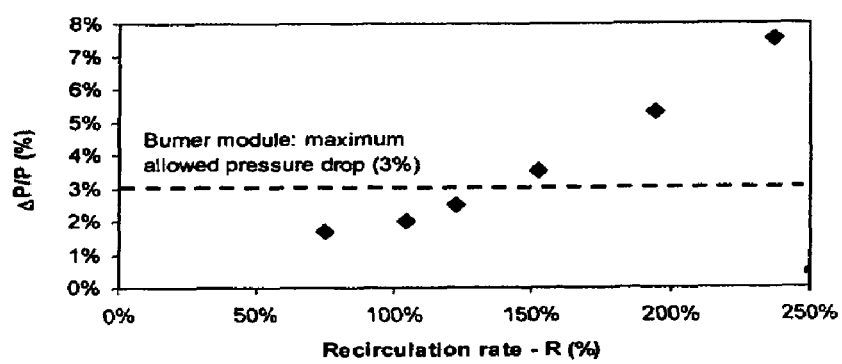
FIG. 14 is a graph of pressure drop against re-circulation rate.

FIG. 14 is a graph of pressure drop against re-circulation rate for a gas turbine with a burner module comprising 18 nozzles of 20 mm diameter; operating under the following conditions: P=22 bar; $T_{in}$=470° C.; air per burner=5.5 kg/s; fuel to burner=0.17 kg/s.

FIG. 14 shows that, for the system operating under the above conditions, the pressure drop limit is exceeded for re-circulation rates greater than around 150%.

On the basis of the above two studies, it is preferable that highly diluted combustion is performed in gas turbine systems (with their characteristic high pressures and very lean stoichiometry) at re-circulation rates higher than 100%. This will establish the non-visible flame associated with highly diluted combustion, with no associated hot spots and even temperature and concentration profiles.

The results of the chemical study indicate that there is a significant advantage in terms of process timescales associated with re-circulation rates higher than 100%. The same study indicates that this beneficial effect is not greatly increased for re-circulation rates higher than 200%. On this basis, it is preferable that highly diluted combustion in gas turbine systems be carried out at re-circulation rates from 100% to 200%. However, aerodynamic studies indicate that high re-circulation rates are associated with undesirably high pressure drops. It therefore may be preferable to run a gas turbine in a highly diluted mode using re-circulation rates lower than 200%, and more preferably lower than 150%.

In other embodiments of the invention, the flue gas re-circulation rate may not be enough to satisfy the targeted thermal conditions of the reacting fuel/oxidant mixture. For example the temperature of the mixture combustion chamber 3 could be lower than the autoignition threshold of the fuel/oxidant mixture. This situation might correspond to a partial load operation in which the oxidant 1 is compressed to a lower pressure than in a full load operation, thus having a lower temperature on leaving the compressor 2. In such a situation, an additional oxidant preheating means is used to overcome this problem.

Figure 2:
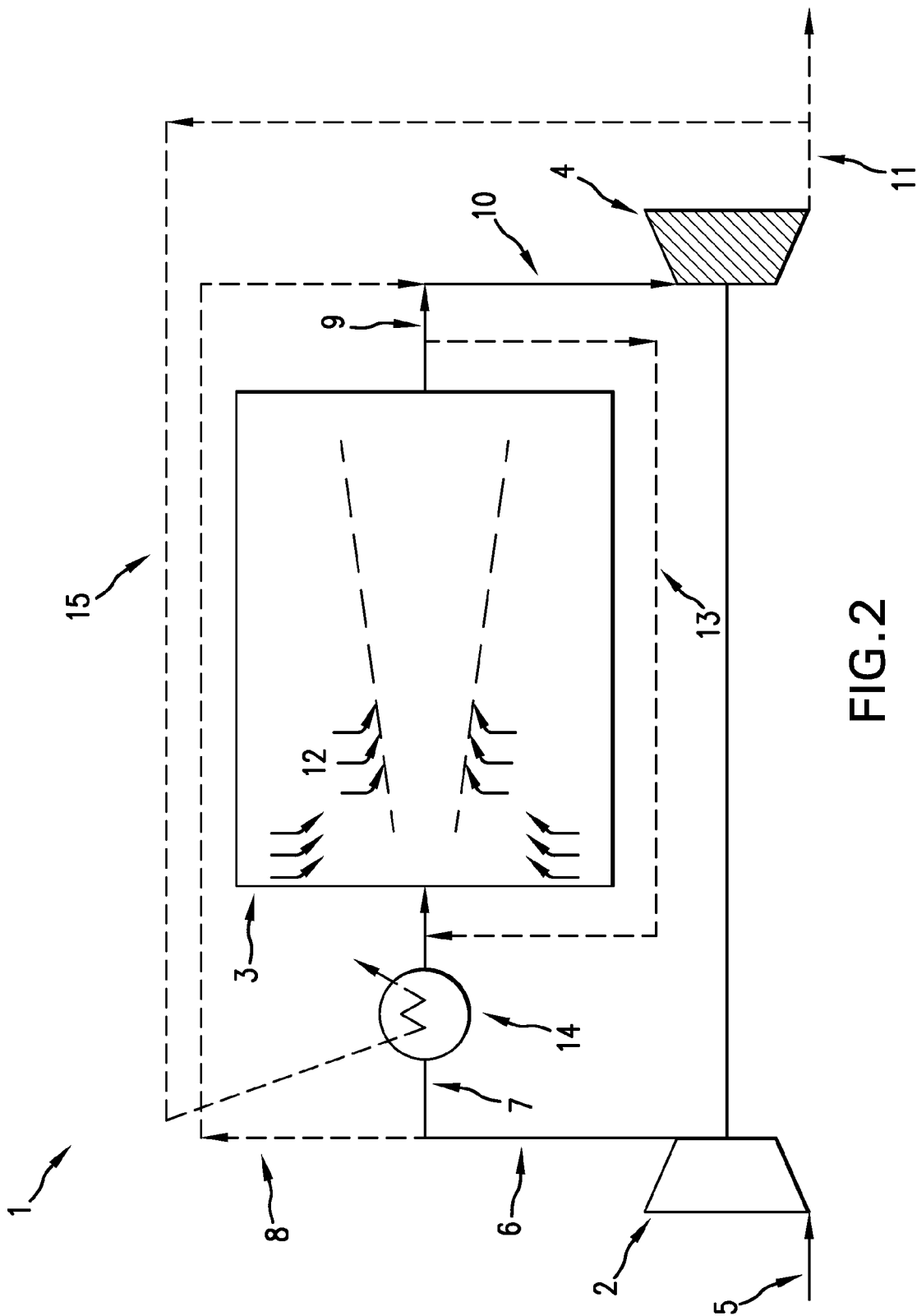
FIG. 2 is a schematic diagram of a gas turbine according to a second embodiment of the invention.

FIG. 2 shows a schematic diagram of a gas turbine according to an embodiment of the invention that employs a heat exchanger 14 to provide additional heating to the compressed oxidant 7. A portion of the exhaust gas 11 from the turbine 4 is directed to the heat exchanger 14, which uses the residual heat of the exhaust gas 11 from the turbine 4 to heat the compressed oxidant 7. In this embodiment, the heat exchanger 14 is of the recuperator type. Alternatively, the heat exchanger 14 could be of the regenerator type.

Figure 3:
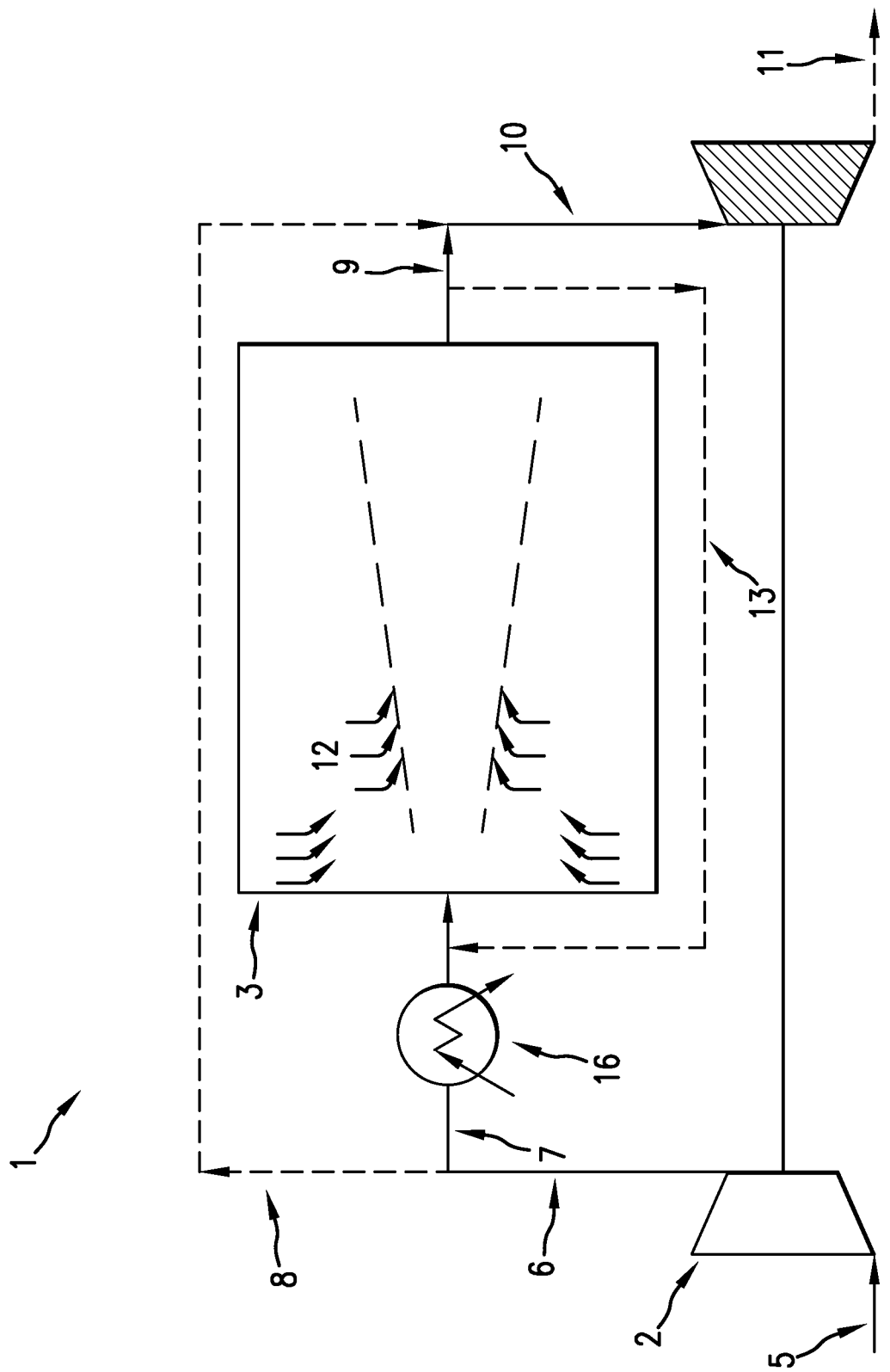
FIG. 3 is a schematic diagram of a gas turbine according to a third embodiment of the invention.

If the residual heat of the exhaust gas 11 from the turbine is not enough to heat the compressed oxidant 7 to the required temperature, an external heat source 16 is used (FIG. 3).

Figure 4:
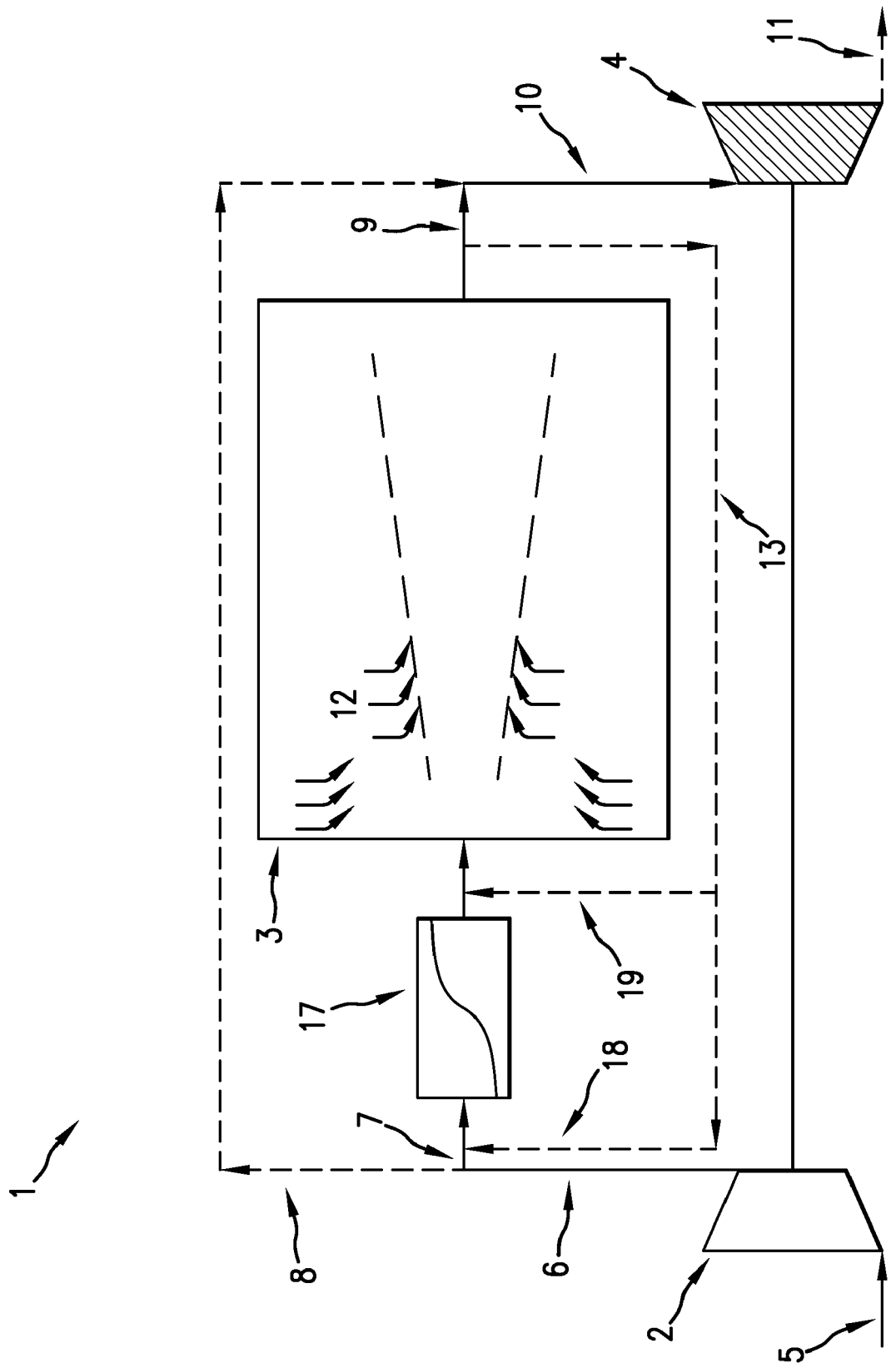
FIG. 4 is a schematic diagram of a gas turbine according to a fourth embodiment of the invention.

Alternatively, the compressed oxidant 7 could be heated to the required temperature necessary for autoignition of the fuel/oxidant mixture by a catalytic pre-burner 17, as illustrated in FIG. 4. In this embodiment, which uses a partial load operation, the compressed oxidant is typically at a pressure of 13 bar and a temperature of 650 K.

The portion of the compressed oxidant 7 that is to be used for combustion is mixed with fuel at very lean conditions and is directed through the catalytic pre-burner 17 in order to enter the combustion chamber 3 at a higher temperature. The catalytic pre-burner 17 runs at very lean conditions, which ensures that additional thermal energy will be added to the stream via surface reaction on the catalytic surface only, minimizing emissions levels. Running the catalytic pre-burner 17 very lean also helps to ensure that the reacting mixture entering the catalyst avoids any risk of catalyst deactivation or overheating.

In embodiments such as that illustrated in FIG. 4, the flue gas re-circulated outside 13 the combustion chamber 3 is re-circulated via a combination of paths upstream 18 and downstream 19 of the catalytic pre-burner 17 in order to provide additional thermal energy and dilution. Alternatively, the flue gas re-circulated outside 13 the combustion chamber 3 may be re-circulated either exclusively upstream 18 or downstream 19 the catalytic pre-burner 17. Flue gas can have the effect of poisoning the catalytic activity. Therefore it may be desirable to limit the flue gas 13 flowing into catalytic pre-burner 17 to the minimum amount needed to control the surface reaction and to control the temperature of the catalytic process.

As an alternative to passing all the compressed oxidant 7 through the catalytic pre-burner 17, embodiments may be arranged in such a way that some of the compressed oxidant 7 bypasses the catalytic pre-burner 17. This might be required to ensure the optimum stoichiometry for the catalytic pre-burner 17, or for heating or cooling purposes. Similarly, it may be desirable to inject part of the fuel into the catalytic pre-burner 17, with the remainder injected directly into the combustion chamber 3.

The catalytic pre-burner 17 can be arranged to work in very lean ($\lambda$>2.5) or very rich ($\lambda$<0.5) conditions, depending on the optimum operating mode of the catalyst. The choice of the operating mode determines the particular ratio of each of the flue gas 13, compressed oxidant 7 and fuel flowing into or bypassing the catalytic pre-burner 17.

Typical conditions inside the combustion chambers 3 of embodiments such as that shown in FIG. 4 include a temperature of 1650 K. NOx levels are typically less than 3 ppm, and CO levels less that 2 ppm.

Figure 5:
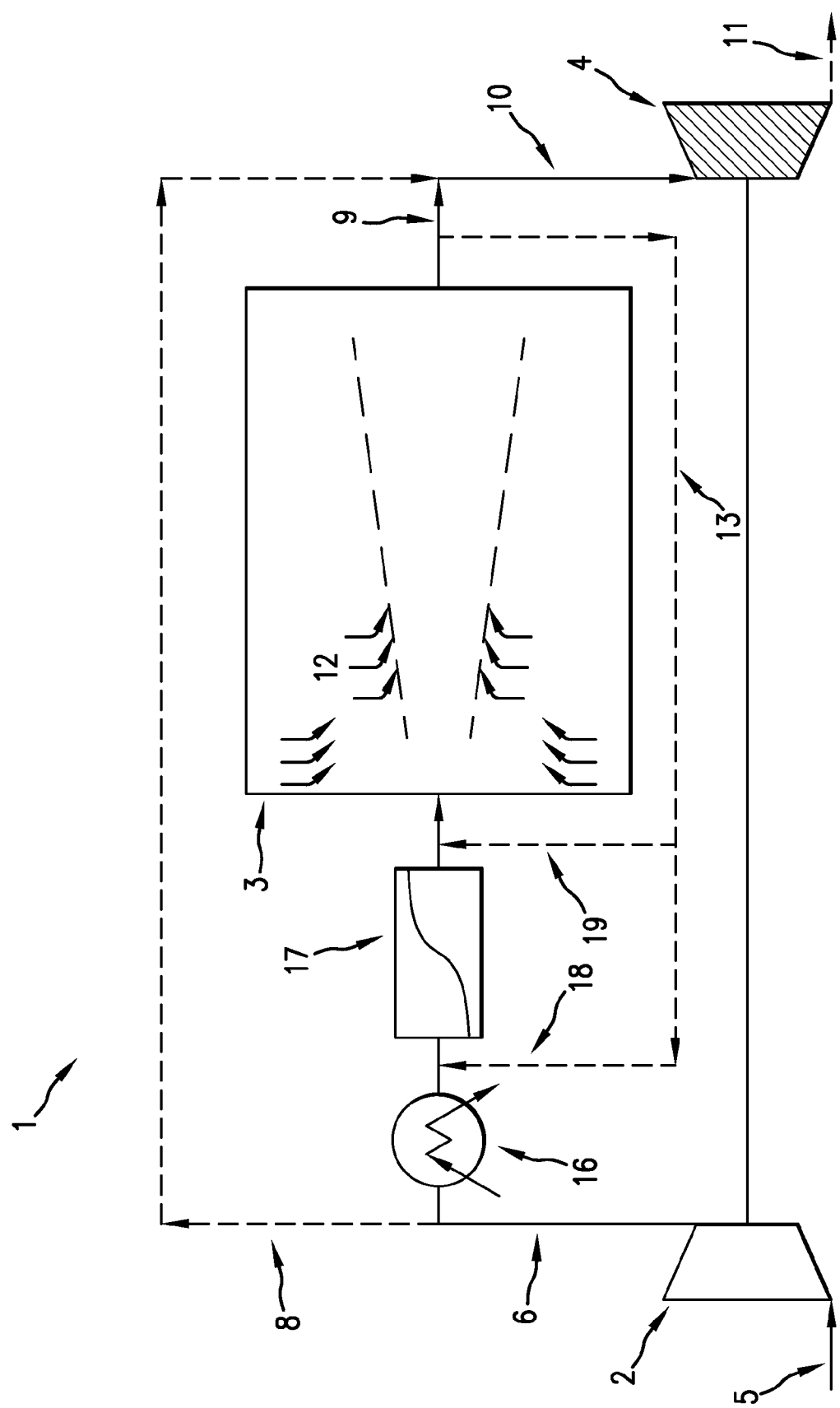
FIG. 5 is a schematic diagram of a gas turbine according to a fifth embodiment of the invention.

In other embodiments, the catalytic pre-burner 17 is coupled with an additional heating means to further boost the preheating action on the compressed oxidant 7. FIG. 5 schematically illustrates an embodiment of the invention that uses an external heat source 16, located upstream the catalytic pre-burner 17 to further heat the compressed oxidant 7.

Figure 6:
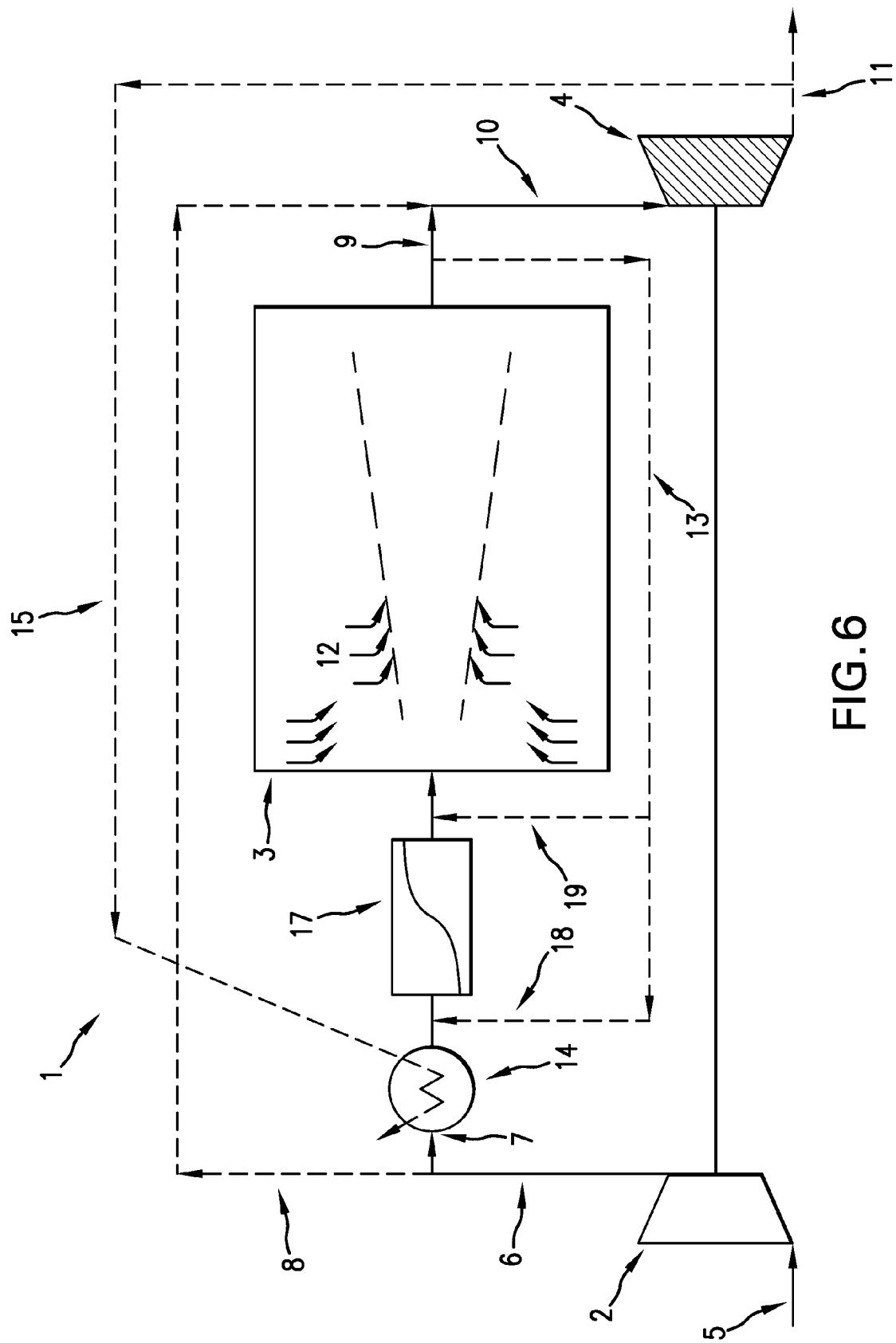
FIG. 6 is a schematic diagram of a gas turbine according to a sixth embodiment of the invention.

In other embodiments still the additional heating means is a heat exchanger 14 of the recuperator type, as illustrated in FIG. 6. Alternatively, the heat exchanger 14 could be of the regenerator type. In either case, the heat exchanger 14 uses the residual heat of the exhaust gas from the turbine 4 to heat the compressed oxidant 7 before it enters the catalytic pre-burner 17.

All the embodiments thus far described have employed flue gas re-circulation via flue gas 12 re-circulated inside the combustion chamber 3 or via flue gas 13 re-circulated directly after exiting the combustion chamber 3, or a combination of the two. In alternative embodiments, flue gas 15 can be re-circulated from the exit of the turbine 4, as illustrated schematically in FIG. 7.

Figure 7:
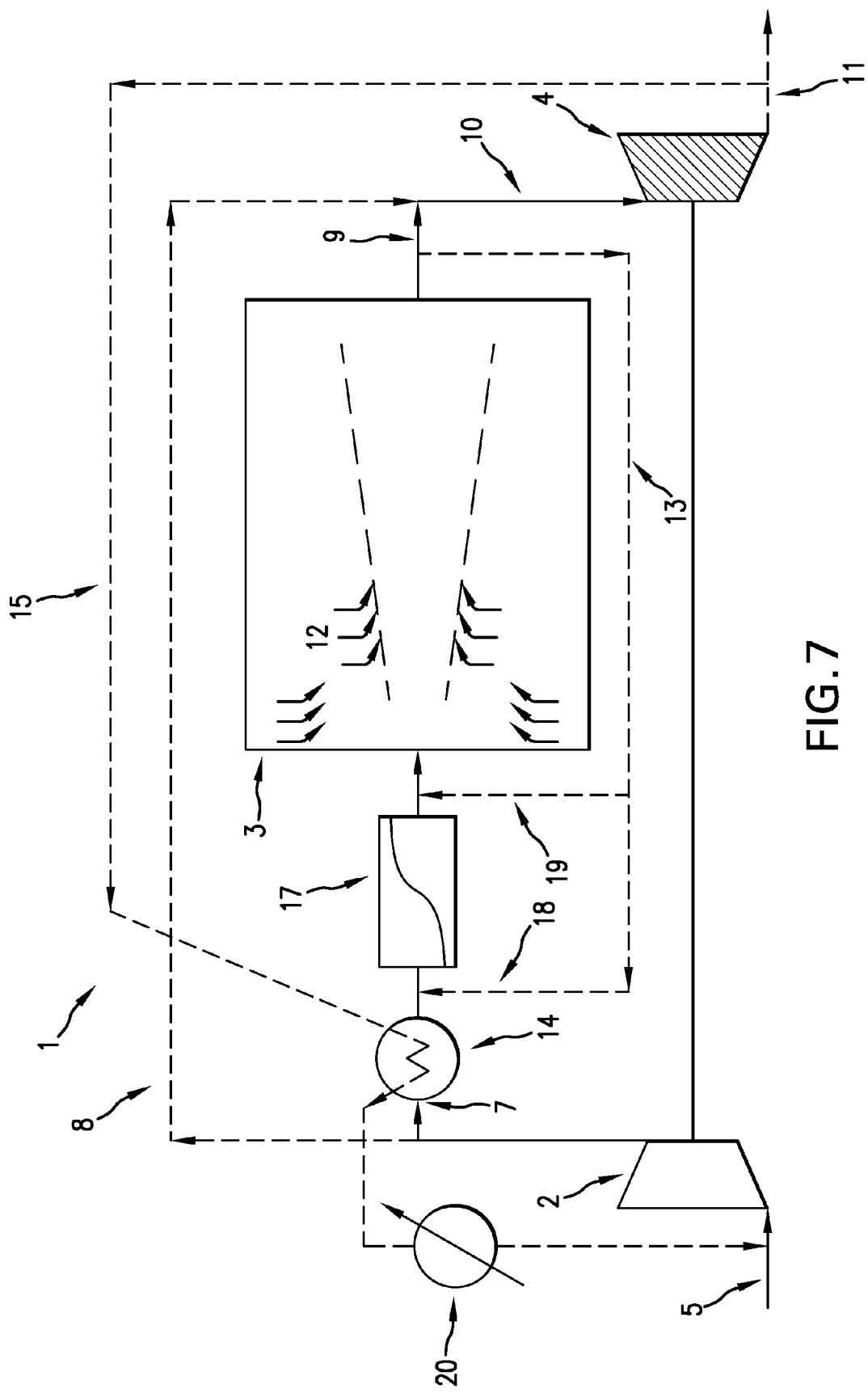
FIG. 7 is a schematic diagram of a gas turbine according to a seventh embodiment of the invention.

The embodiment of FIG. 7 could be used when a high flue gas re-circulation is not entirely achievable inside the combustion chamber 3 and flue gas re-circulation outside the combustion chamber 3 causes too high-pressure losses. The flue gases 15 are directed from the exit of the turbine 4 and re-circulated to the entrance of the compressor 2, where they are mixed with fresh oxidant 5. Embodiments that employ flue gas re-circulation in this way can be applied in combination with flue gas re-circulation inside 12 the combustion chamber 3 and/or high-pressure flue gas re-circulation outside 13 the combustion chamber 3. The amount of re-circulation via each possible path rate would depend on several constraints, such as pressure drop and thermal conditions and requirements to obtain a reacting mixture above the autoignition threshold inside the combustion chamber 3.

The flue gas 15 re-circulated from the exit of the turbine 4 needs to be cooled down before being mixed with the fresh oxidant stream 5, as this is preferable from an engine efficiency point of view. In the embodiment shown in FIG. 7, the heat extracted is used to preheat the compressed oxidant 7 before it enters the combustion chamber 3 via a heat exchanger 14. It is then further cooled down by the extraction of the residual thermal energy by an auxiliary component 20. Alternatively, the residual heat of the flue gas 15 re-circulated from the exit of the turbine 4 may be used for a different purpose, or cooled via alternative means.

This configuration can be applied to all the previously described embodiments, with all the different solutions to preheating the compressed oxidant stream 7 or with different uses of the residual heat of flue gases 15.

Figure 8:
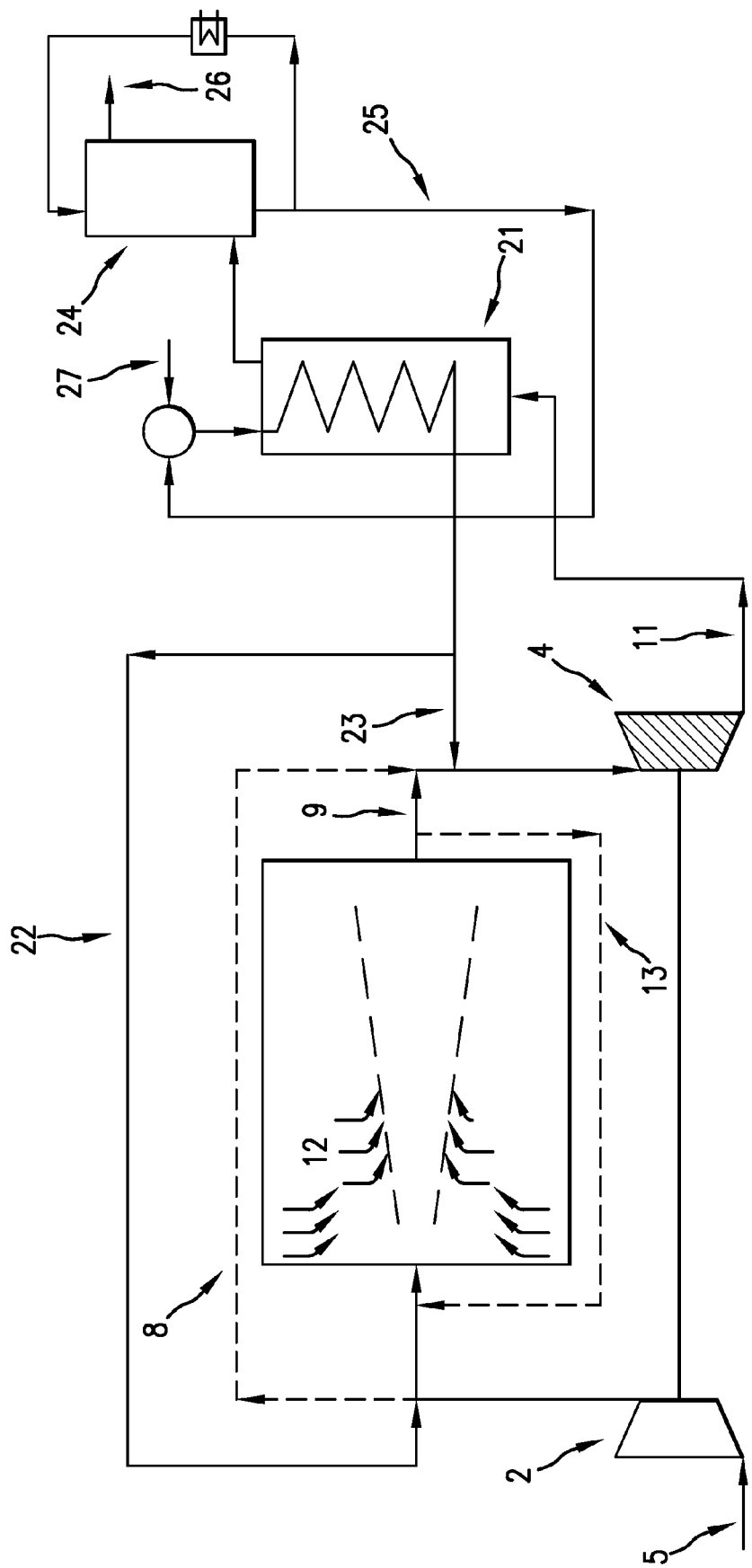
FIG. 8 is a schematic diagram of a steam injected gas turbine according to an eighth embodiment of the invention.

In further embodiments of the invention, a gas turbine adapted to operate in a highly diluted combustion mode is coupled with a steam generation process to form a Steam Injected Gas Turbine, as illustrated schematically in FIG. 8. The injection of steam results in additional dilution of the already highly diluted combustion mixture resulting from the high levels of flue gas re-circulation 12, 13. Such a system can be termed a "Flameless Steam Injected Gas Turbine" (FSIGT).

Steam is produced in a steam generator 21 that uses the energy from the exhaust gas 11 from the gas turbine 4 to produce steam. Steam 22 is then fed into the combustion chamber 3 to further dilute the combustion mixture and suppress the NOx formation via the N2O kinetic pathway.

As shown in FIG. 8, steam 23 is also injected downstream the combustion chamber 3 to help drive the turbine 4. This has the effect of increasing the total power output of the system. Alternatively all the steam 22 could be injected into the combustion chamber 3.

The system illustrated in FIG. 8 operates in a closed loop, and steam discharged downstream the gas turbine with the exhaust gas 11 is recuperated in a condenser 24. The resulting water 25 is then reintegrated into the steam production process. The remaining flue gas 26 is discharged after the passing through the condenser 24. Alternatively the system could operate an open cycle, and fresh clean water could be continuously fed into the steam generator 21, via water line 27.

An advantage provided by a FSIGT system is an increase in the gas turbine efficiency. For a given oxidant flow through the compressor 2 of a FSIGT compared to that of a non-steam injected turbine gas turbine, the power demand remains unchanged. However, the mass flow through the turbine 4 is increased, which increases the power output for the FSIGT. This allows FSIGT systems according to the present invention to meet ultra low NOx requirements, while maximizing efficiency.

In other embodiments, oxygen, rather than air, could be used as the oxidant. This would allow a Zero Emission System to be run. Any of the previously described embodiments could be adapted to use oxygen as the oxidant.

Figure 9:
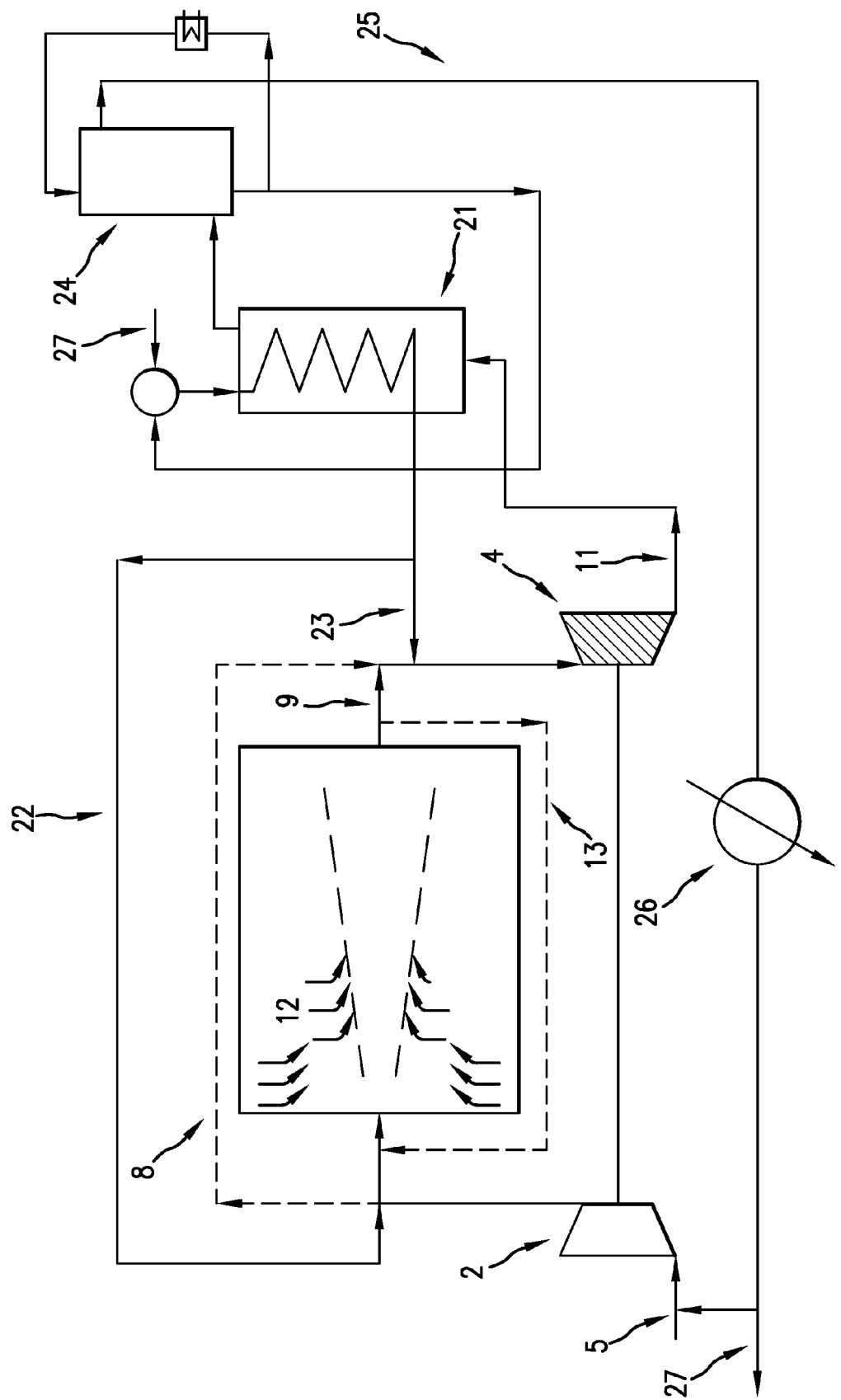
FIG. 9 is a schematic diagram of a steam injected gas turbine according to a ninth embodiment of the invention.

An example of such a system is illustrated in FIG. 9. The oxygen 5 is compressed by the compressor 2 and fed into the combustion chamber 3 where a high level of flue gas re-circulation is provided by means inside 12 and outside 13 the combustion chamber 3. Flue gas re-circulation has the effect of mitigating the explosive effect of the reacting mixture of oxygen and fuel. Combustion takes place without any NOx production, since nitrogen is absent from the whole process.

In embodiments that use oxygen as the oxidant, the flue gas dilution acts to control the flame temperature. The exhaust gases 11 produced by the combustion chamber 9 drive the turbine 4, and their energy is further used to produce steam (via the steam generator 21). A portion of the steam 22 is then be injected into the combustion chamber 3 to control the process temperature, while another portion 23 is used to boost the power output of the turbine 23.

Steam mixes with the combustion products and is then recuperated downstream the steam generator in a condenser 24. The remaining flue gases 25, which are mainly carbon dioxide, are then cooled down by a cooling means 26, and may be in part re-circulated to the compressor 2 to contribute to the flue gas dilution necessary to control the combustion process. The excess carbon dioxide 27 can be removed and stored for an alternative use.

Many further variations and modifications will suggest themselves to those versed in the art upon making reference to the foregoing illustrative embodiments, which are given by way of example only, and which are not intended to limit the scope of the invention, that being determined by the appended claims. The entirety of each of the aforementioned published documents is incorporated by reference herein.

The invention claimed is:

1. A gas turbine capable of operating in a highly diluted mode, the gas turbine comprising:
    a compressor adapted to compress oxidant;
    a combustion chamber adapted to accept the compressed oxidant and including an exit means for flue gas;
    a turbine; and
    flue gas re-circulation means for re-circulating the flue gas from the combustion chamber and mixing the flue gas with the compressed oxidant from the compressor to provide a highly diluted mode of combustion with a non-visible flame with a flue gas re-circulation rate of from 100% to 200%;
    wherein the flue gas re-circulation means is also for mixing the re-circulated flue gas with a premixed stream of fuel and oxidant before the premixed stream enters the combustion chamber.

2. A gas turbine according to claim 1, wherein the flue gas re-circulation means is for providing a flue gas re-circulation rate of from 100% to 150%.

3. A gas turbine according to claim 1, wherein the flue gas re-circulation means is for providing flue gas re-circulation inside the combustion chamber.

4. A gas turbine according to claim 1, wherein the flue gas re-circulation means is for providing flue gas re-circulation outside the combustion chamber.

5. A gas turbine according to claim 4, wherein the flue gas re-circulation means is for re-circulating flue gas that exits the turbine.

6. A gas turbine according to claim 5, wherein the gas turbine is adapted to cool the re-circulated flue gas that exits the turbine and to feed the re-circulated flue gas that exits the turbine into the compressor along with the oxidant.

7. A gas turbine according to claim 1, wherein the flue gas re-circulation means comprises means inside and outside the combustion chamber.

8. A gas turbine according to claim 1, further comprising:
    an oxidant pre-heating means for heating the compressed oxidant before said compressed oxidant enters the combustion chamber.

9. A gas turbine according to claim 8, wherein the oxidant pre-heating means comprises a heat exchanger adapted to use the heat of gas exited from the turbine to heat the compressed oxidant.

10. A gas turbine according to claim 9, wherein the heat exchanger comprises a recuperator or a regenerator.

11. A gas turbine according to claim 10, wherein the flue gas re-circulation means is for providing flue gas re-circulation outside the combustion chamber;
    wherein the flue gas re-circulation means is for re-circulating flue gas that exits the turbine; and
    wherein the heat exchanger is adapted to cool re-circulated flue gas exited from the turbine.

12. A gas turbine according to claim 9, wherein the heat exchanger is arranged to cool re-circulated flue gas exited from the turbine.

13. A gas turbine according to claim 9, wherein the oxidant pre-heating means comprises an external heat source.

14. A gas turbine according to claim 13, wherein the external heat source comprises a catalytic pre-burner.

15. A gas turbine according to claim 1, wherein the oxidant is oxygen.

16. A flameless steam injected gas turbine comprising:
    a gas turbine according to claim 1; and
    a steam generator adapted to produce steam using energy from the flue gas that exits the turbine, and to feed said steam into the combustion chamber in order to dilute the oxidant and fuel mixture.

17. A flameless steam injected gas turbine according to claim 16, wherein the flameless steam injected gas turbine is configured and arranged to operate a closed loop system, and further comprising:

a condenser adapted to condense the steam and re-introduce resulting water into the steam generator.

18. A flameless steam injected gas turbine according to claim 16, wherein the flameless steam injected gas turbine is configured and arranged to operate an open loop system, and further comprising:
means for continuously topping up the steam generator with water.

19. A flameless steam injected gas turbine according to claim 16, further comprising:
means for feeding a portion of the steam produced by the steam generator into the turbine to increase the power output of the turbine.

20. A method of operating a flameless steam injected gas turbine comprising:
using a gas turbine according to claim 1;
using a steam generator to produce steam using energy from the flue gas that exits the turbine; and
feeding the steam into the combustion chamber in order to dilute the oxidant and fuel mixture.

21. A method of operating a flameless steam injected gas turbine according to claim 20, comprising:
operating said flameless steam injected gas turbine as a closed loop system; and
using a condenser to condense the steam and re-introduce resulting water into the steam generator.

22. A method of operating a flameless steam injected gas turbine according to claim 21, comprising:
operating said flameless steam injected gas turbine as an open loop system; and
continuously topping up the steam generator with water.

23. A gas turbine according to claim 1, wherein said compressor is adapted to heat said oxidant by compression work in said compressor.

24. A method of operating a gas turbine comprising:
using a compressor to compress oxidant;
using a combustion chamber to accept the compressed oxidant and provide an exit means for flue gas;
using a turbine; and
using a flue gas re-circulation means to re-circulate the flue gas from the combustion chamber and mix the flue gas with the compressed oxidant from the compressor in order to provide a highly diluted mode of combustion with a non-visible flame with a flue gas re-circulation rate of from 100% to 200%; and
using the flue gas re-circulation means to mix the re-circulated flue gas with a premixed stream of fuel and oxidant before the premixed stream enters the combustion chamber.

25. A method according to claim 24, further comprising:
using the flue gas re-circulation means to provide a flue gas re-circulation rate of from 100% to 150%.

26. A method according to claim 24, comprising:
using the flue gas re-circulation means to provide flue gas re-circulation inside the combustion chamber.

27. A method according to claim 24, comprising:
using the flue gas re-circulation means to provide flue gas re-circulation outside the combustion chamber.

28. A method according to claim 27, further comprising:
using the flue gas re-circulation means to re-circulate flue gas that exits the turbine.

29. A method according to claim 28, further comprising:
cooling the re-circulated flue gas that exits the turbine before feeding said flue gas that exits the turbine into the compressor along with the oxidant.

30. A method according to claim 24, comprising:
using the flue gas re-circulation means to provide flue gas re-circulation by a combination of means inside and outside the combustion chamber.

31. A method according to claim 24, comprising:
using an oxidant pre-heating means to heat the compressed oxidant before said compressed oxidant enters the combustion chamber.

32. A method according to claim 31, further comprising:
using a heat exchanger to provide the oxidant pre-heating means; and
employing the heat exchanger to heat the compressed oxidant using the heat of gas exited from the turbine.

33. A method according to claim 32, further comprising:
providing the heat exchanger including a recuperator or a regenerator.

34. A method according to claim 33, comprising:
using the flue gas re-circulation means to provide flue gas re-circulation outside the combustion chamber;
using the flue gas re-circulation means to re-circulate flue gas that exits the turbine; and
using the heat exchanger to cool the re-circulated flue gas exited from the turbine.

35. A method according to claim 32, comprising:
using the heat exchanger to cool the re-circulated flue gas exited from the turbine.

36. A method according to claim 32, comprising:
using an external heat source to provide the oxidant pre-heating means.

37. A method according to claim 36, further comprising:
using a catalytic pre-burner to provide the external heat source.

38. A method of operating a flameless steam injected gas turbine according to claim 37, further comprising:
feeding a portion of the steam produced by the steam generator into the turbine in order to increase the power output of the turbine.

39. A method according to claim 24, comprising:
using oxygen as the oxidant.

40. A method according to claim 24, further comprising:
heating the oxidant with compression work by the compressor.

* * * * *